3,360,395
METHOD OF PRODUCING UREA-FORMALDEHYDE RESIN COATED SAND

Julius M. Bleuenstein, Taylor, Mich., assignor to Allied Chemical Corporation, New York, N.Y., a corporation of New York
No Drawing. Filed Apr. 22, 1964, Ser. No. 361,866
6 Claims. (Cl. 117—100)

ABSTRACT OF THE DISCLOSURE

A method of producing urea-formaldehyde resin coated sand wherein sand is mixed with molten urea and a liquid non-resinous urea-formaldehyde concentrate to give a formaldehyde/urea mol ratio of about 1.25–2.0. The mass is mixed so as to blend the urea-formaldehyde with the urea, whereupon the mixing is continued until the mass breaks down to a free-flowing resin coated sand.

---

This invention relates to the production of urea-formaldehyde resin coated sand. More particularly, it relates to a novel process for coating sand with a potentially thermosetting urea-formaldehyde resin so as to produce dry, free-flowing particles for use in the "shell molding" process.

Although the process for which the composition of this invention is intended will hereinafter be conveniently referred to as the "shell molding" process, it is to be understood that it is equally adaptable for use in the manufacture of core molds.

It is known to produce shell molding compositions consisting essentially of sand and a binder such as wax, plaster, linseed oil, cereal or a thermosetting resin, or a combination of these. Many of these compositions are deficient in that they are difficult to handle, cannot be stored, and/or do not produce a satisfactorily smooth cast. While overcoming many of these difficulties, dry mixtures of sand and a powdered resin often fail to produce a sufficiently uniform composition due to separation of the sand and resin particles which is caused by the difference in size and density.

The increasing use of aluminum and other light metals having relatively low pouring temperatures has brought about the need for binders which will decompose to facilitate parting of metal and mold at lower temperatures than previously required. Urea-formaldehyde resins have been found to satisfy this requirement and have been used with some degree of success in solution form in a wet resin-sand mixture. Such mixtures, however, are not stable and must be used promptly.

It is an object of my invention to provide a method of producing a resin-sand molding composition which overcomes the aforementioned difficulties and has especially desirable properties for shell molding.

It is a further object of my invention to provide a method of producing urea-formaldehyde resin coated sand which is storable and easy to handle and which has excellent shake-out or release properties.

Other objects and advantages of my invention will be obvious to those skilled in the art from the following description.

I have discovered that the above objects may be accomplished by a process which, in general, comprises the steps of:

(1) Mixing 100 parts of sand with about 1.5–4.0 parts of molten urea until the urea covered each of the sand grains.

(2) Adding sufficient liquid non-resinous urea-formaldehyde concentrate to give a calculated formaldehyde/urea mol ratio of about 1.25–2.0.

(3) Mixing the mass until the urea-formaldehyde concentrate blends with the urea, and continuing the mixing until the mass breaks down to a free-flowing resin coated sand.

(4) Cooling the sand to ordinary temperatures.

The amount of urea necessary to coat the sand will depend on the particle size of the sand. More than 4 parts per 100 parts of sand, however, will not be necessary and is, in fact, undesirable since it will increase the amount of urea-formaldehyde concentrate necessary to obtain the desired final urea-formaldehyde mol ratio and result in an excess of coating composition.

It is important that the urea is melted on the sand prior to the addition of the urea-formaldehyde concentrate. Attempts to add the urea to the urea-formaldehyde concentrate prior to the mixing with sand have led to molds of poor quality. Such molds have been characterized by structural weakness and in many cases have broken when removed from the pattern. The reason for this is not clearly understood, but without predicating this invention on theory it may be surmised that the urea is partially decomposed by the hot sand and that the decomposition products have a favorable effect on the final resin coating. On the other hand, it is possible that the two-step addition of reactants limits the extent of reaction and the partially reacted urea-formaldehyde resin produced thereby is more desirable. The temperature of the sand should be not above about 450° F. since higher temperature would cause too rapid decomposition of the urea. Preferably the sand is maintained at about 275° to 300° F. while being mixed with the molten urea.

The non-resinous urea-formaldehyde concentrate is added after the sand is uniformly coated with urea. The temperature of the urea-coated sand should not be so high as to induce setting up of the urea-formaldehyde before it has had an opportunity to coat all the sand particles. Also too high temperatures will result in rapid evolution of formaldehyde vapors. The maximum temperature will be determined by the efficiency of the mixing technique and also by the presence or absence of a catalyst. It is not critical that the urea coated sand be allowed to cool before adding the non-resinous urea-formaldehyde concentrate, but it is preferred to cool it to about 230° F. or below, more preferably 135–170° F.

The non-resinous urea-formaldehyde concentrate called for in this invention is a stable urea-formaldehyde reaction product containing polymethylol ureas. Such products contain 60–90% total solids, have a formaldehyde: urea mol ratio of 4.0:1 to 7.3:1 and a pH of at least 7.0.

For the purposes of this invention, it is particularly advantageous to employ a liquid non-resinous urea-formaldehyde concentrate prepared in accordance with United States Patent 2,652,377 and containing about 25% urea, 60% formaldehyde and 15% water; such a material not being a simple urea-formaldehyde mixture but containing a part of the formaldehyde in combination with urea. Preferably, the solids, non-resinous reaction product of urea and formaldehyde, amount to about 80–90% of the concentrate and the formaldehyde:urea mol ratio in the concentrate is about 4.0:1 to 6.5:1. Such a product is produced by Allied Chemical Corporation and marketed as UF Concentrate 85.

The addition of up to about one pound of melamine per 100 pounds of sand has been found to improve the strength of the binder. The products containing melamine are also less hygroscopic than the ordinary urea-formaldehyde resin coated sand. The melamine is normally mixed with the urea-formaldehyde concentrate before it is added to the sand, but the melamine may be added with the urea. When melamine is added, the amount of urea melted on the sand is normally decreased, proportionately; best results are obtained when two mols of melamine are used to replace about three mols of urea.

The time required to bring the urea-formaldehyde resin coated sand to a dry, free flowing state will depend on the temperature as well as the particular characteristics of the non-resinous urea-formaldehyde concentrate used. Volatiles are removed during the heating.

Hardener catalysts such as ammonium chloride may be mixed with the urea-formaldehyde concentrate if desired, but resin coated sands of good quality for molding have been prepared without addition of catalysts.

Preferably, about 0.2 part of a lubricant such as magnesium and zinc soaps of stearic, palmitic and oleic acids is incorporated into the mixture.

The following examples will serve to illustrate the process of this invention.

Although certain preferred embodiments of the invention have been disclosed for purpose of illustration it will be evident that various changes and modifications may be made therein without departing from the scope and spirit of the invention.

EXAMPLE 1

50 pounds of clean silica sand at 450° F. was charged into a Simpson muller, and 2 pounds of urea was melted onto the same while milling. The mixture was then cooled to about 170° F. by transfer to a single paddle mixer, then mixed with 3 pounds "U-F Concentrate–85" previously described. Mixing was continued for 20 minutes until the mass broke down to a dry, free-flowing sand, at which point 2 ounces of calcium stearate were added. The resulting mixture was cooled to room temperature and stored in a closed container. The product was storable without deterioration for months in closed containers, but was somewhat hygroscopic when exposed to atmospheric air.

Standard tensile strength test bars were prepared by pouring the coated sand into a steel mold preheated to about 300° F., the mold being shaped to form a symmetrical test bars which in the elevated view resemble hour glasses nipped into a one inch width and which are a uniform 0.3 inch in depth. After about 35 seconds of contact, the excess sand was removed. Tensile strength of these test bars averaged 200 p.s.i. It will be noted that no catalyst was added to this formulation. In casting operations with aluminum, cores prepared in the same manner as the above test bars were readily removed from the finished castings.

EXAMPLE 2

The procedure of Example 1 was repeated using 50 pounds of silica sand, 2 pounds of urea, and 3 pounds of "U-F Concentrate–85," except that 0.1 pound of CaCl$_2$ and 0.3 pound of NH$_4$Cl were added to the concentrate before it was mixed with the urea-coated sand. There was no detectable difference in the product as compared with the product of Example 1.

EXAMPLE 3

In a pug mill, 200 pounds of bank sand containing a small percentage of clay was heated to 300° F. by means of a direct flame; 3 pounds of urea was then added and melted on the sand with mixing. The mixture was then cooled to about 170° F. by means of a blast of air and a mixture containing 6 pounds of "U-F Concentrate–85," 0.2 pound of NH$_4$Cl, 0.25 pound of Ca(OH)$_2$, and 1 pound of NH$_4$HCO$_3$ was added and mixed. After about 15 minutes heating at 170° F. using a direct flame, the mass broke down into a dry free-flowing resin coated sand. The mix was cooled to about 90° F. with a blast of air and stored. Test bars prepared as described in Example 1 showed a tensile strength of 120 p.s.i.

EXAMPLE 4

About 100 pounds of silica sand was mixed with 2.2 pounds of urea and heated to about 275° F. by means of a direct flame to melt the urea, which then coated the sand. The sand-urea mixture was cooled to 170° F. and a mixture of 6 pounds of "U-F Concentrate–85," 1 pound of melamine, 0.22 pound of ammonium chloride, and 0.22 pound calcium hydroxide was added thereto. The resulting mass was mixed and heated at 230° F. for five minutes then transferred to a cold mixer and mixed and cooled with a blast of air until the mass became free-flowing. The resulting resin coated sand remained free-flowing without the addition of calcium stearate or other lubricant. The product was less hygroscopic than the products of Example 1 and Example 2. Test bars prepared as described in Example 1 showed a tensile strength of 230 p.s.i.

I claim:

1. The process for producing storable urea-formaldehyde resin coated sand which comprises mixing sand with a sufficient amount of molten urea and for a sufficient time to cover substantially each sand grain with urea, and mixing with the resulting mass sufficient non-resinous urea-formaldehyde concentrate having a formaldehyde to urea mol ratio of about 4.0:1 to 7.3:1 to give a calculated formaldehyde/urea mol ratio of about 1.25 to 1 to 2.0 to 1 until the resulting mixture has broken down to a mass of dry free-flowing resin coated particles.

2. A process for producing storable urea-formaldehyde resin coated sand which comprises mixing 100 parts of sand with about 1.5 to about 4 parts urea at about 275–450° F. until the urea melts and covers substantially each of the sand grains, and mixing therewith sufficient non-resinous urea-formaldehyde concentrate having a formaldehyde to urea mol ratio of about 4.0:1 to 7.3:1 to give a calculated formaldehyde/urea mol ratio of about 1.25 to 1 to 2.0 to 1 and cooling the mixture to ordinary temperatures when it is broken down to a mass of dry, free-flowing resin coated particles.

3. The process of claim 2 wherein the urea coated sand is cooled to 135–235° F. prior to the addition of the non-resinous urea-formaldehyde concentrate.

4. A process for producing storable urea-formaldehyde resin coated sand which comprises mixing 100 parts of sand with about 1.5 to about 4 parts urea at about 275–450° F. until the urea melts and covers substantially each of the sand grains, and mixing therewith a non-resinous urea-formaldehyde liquid concentrate containing about 80 to 90% non-resinous urea-formaldehyde reaction product having a formaldehyde to urea mol ratio of about 4.0:1 to 6.5:1 to give a calculated formaldehyde/urea mol ratio of about 1.25 to 1 to 2.0 to 1 and cooling the mixture to ordinary temperatures when it is broken down to a mass of dry, free-flowing resin coated particles.

5. The process of claim 4 in which up to about 1 part melamine is added per 100 parts sand, 1 mol of melamine replacing about 1.5 mols of urea.

6. The process of claim 4 in which about 0.2 part of a lubricant selected from the group consisting of the calcium, magnesium or zinc soap of oleic, palmitic or stearic acid is added per 100 parts sand mixture before cooling.

References Cited

UNITED STATES PATENTS

| | | | |
|---|---|---|---|
| 2,652,377 | 9/1953 | Kise | 260—69 X |
| 2,706,163 | 4/1955 | Fitko | 117—100 X |
| 2,806,832 | 9/1957 | Drumm | 117—100 X |
| 2,807,556 | 9/1957 | Stark | 117—100 |
| 2,829,982 | 4/1958 | Hoyt | 117—100 |
| 2,888,418 | 5/1959 | Albanese | 117—100 X |
| 2,955,336 | 10/1960 | Horn et al. | 117—100 X |
| 2,991,267 | 7/1961 | Bean | 117—100 X |
| 3,151,027 | 9/1964 | Cooley et al. | 117—100 X |

MURRAY KATZ, *Primary Examiner.*

WILLIAM D. MARTIN, *Examiner.*

E. J. CABIC, *Assistant Examiner.*